Feb. 3, 1959 G. J. HEISIG 2,872,511
TELEVISION RECEIVER
Filed May 20, 1953
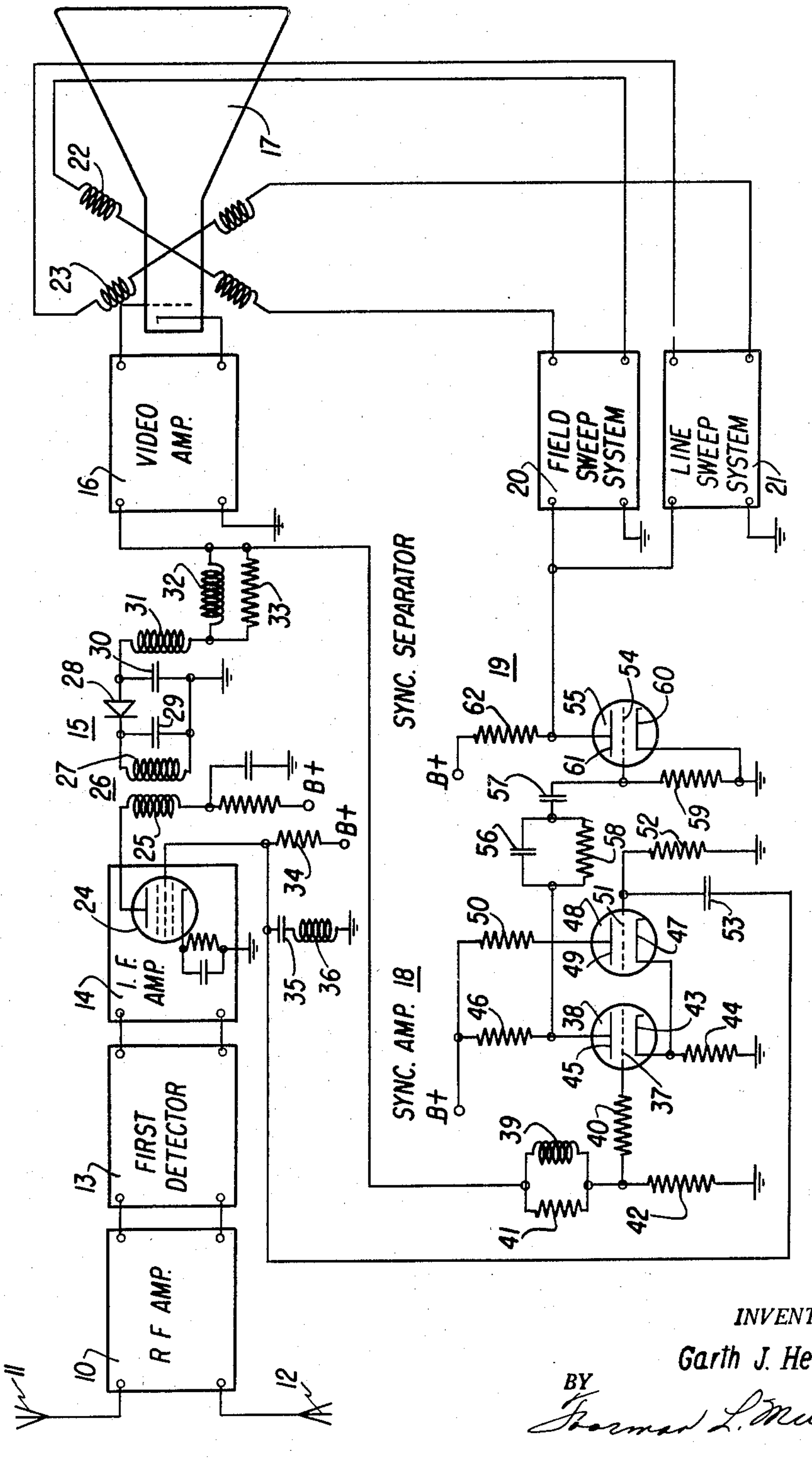
INVENTOR.
Garth J. Heisig
BY Norman L. Mueller
Atty.

2,872,511

TELEVISION RECEIVER

Garth J. Heisig, Arlington Heights, Ill., assignor to Motorola, Inc., Chicago, Ill., a corporation of Illinois Application May 20, 1953, Serial No. 356,286

5 Claims. (Cl. 178—7.3)

This invention relates to television receivers, and more particularly to an improved television receiver which includes a network for enabling the synchronizing signal separating circuit of the receiver efficiently to separate the line and field synchronizing components of a received television signal from the remainder of the signal even during intervals of noise interference.

In accordance with current television broadcasting standards in the United States, the composite television signal, which is amplitude-modulated upon a picture carrier wave, comprises a train of relatively narrow line synchronizing components recurring at the end of each scanning line and a train of relatively wide field synchronizing components recurring at the end of each complete picture field. These components all have the same amplitude with respect to a unidirectional reference potential level corresponding to zero carrier amplitude, and this amplitude is greater than the maximum amplitude of any of the interspersed picture signal or video components.

The line and field synchronizing components are separated from the remainder of the picture signal in the television receiver and utilized to synchronize the line and field scanning-wave generators, as is well known. It is common practice to accomplish this separation by means of a peak detector circuit which effectively clips off all portions of the composite signal below the synchronizing component level and which normally passes only the aforementioned synchronizing components. Such a simple amplitude clipper circuit is satisfactory so long as only the received synchronizing components extend above the clipping level; but spurious and unwanted noise bursts are also very often received in conjunction with the television signal, and these bursts, likewise, have sufficient amplitude to pass through the clipper and often have peak amplitudes greater than the peaks of the synchronizing components.

It is usual in present-day television receivers, to render the amplitude clipper synchronizing signal separator self-biasing so that it clips the synchronizing components and passes these components to the exclusion of the video components despite amplitude changes in the composite signal applied thereto. When the aforementioned noise bursts are impressed on a self-biasing amplitude clipper and have sufficient amplitude or a sufficiently high repetition rate, they quickly charge up the self-biasing circuit of the clipper. This action produces a resulting paralysis of the clipper and a loss of synchronization for intervals corresponding to the time constant of the self-biasing circuit.

It is an object of the present invention to provide an improved television receiver which incorporates a self-biased synchronizing signal separator and which is constructed so that noise bursts received concurrently with the television receiver do not produce the aforementioned paralysis of the separator.

A further object of the invention is to provide such an improved television receiver which incorporates an exceedingly simple circuit to prevent noise bursts from reaching the aforementioned self-biased separator thereby obviating paralysis of the separator by such bursts.

A feature of the invention is the provision of an amplifier circuit interposed between the second detector of the receiver and the synchronizing signal separator and which translates the detected signal from the detector to the separator but which is rendered insensitive for the duration of each noise burst received concurrently with the television signal.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a television receiver constructed in accordance with the invention.

The television receiver of the invention is intended to utilize a television signal which includes video components, synchronizing components having a peak amplitude exceeding that of the video components, and undesired noise components having peak amplitudes exceeding that of the synchronizing components. The receiver comprises a detector for producing, in response to such a television signal, a composite video signal including the aforementioned video synchronizing and noise components. An amplifier for the composite video signal is included in the receiver and this amplifier includes an electron discharge device having input electrodes coupled to the detector. A control circuit, including a second electron discharge device, is coupled to the first mentioned discharge device for controlling the bias on the first device in accordance with the current flow in the second device. Finally, a network is provided for impressing the aforementioned noise components on the second discharge device to vary the current flow therein for the duration of each such noise component thereby to alter the bias on the first mentioned discharge device for the duration of each such component.

The television receiver illustrated in the drawing includes a radio frequency amplifier 10 having input terminals connected to an antenna circuit 11, 12 and output terminals connected to a first detector 13. First detector 13 is coupled through an intermediate frequency amplifier 14 of any desired number of stages to a second detector indicated generally as 15. Second detector 15 is coupled through a video amplifier 16 to the input electrodes of a cathode-ray image reproducing device 17.

Second detector 15 is also coupled to a synchronizing signal amplifier 18, which, in turn, is coupled to a synchronizing signal separator 19. Separator 19 is coupled to a field sweep system 20 and to a line sweep system 21, the sweep systems being coupled respectively to the field deflection elements 22 and line deflection elements 23 of reproducing device 17.

As previously stated, the television receiver is intended to utilize a television signal having video frequency components, line and field synchronizing components having an amplitude exceeding the peak amplitude of the video components, and which is accompanied by unwanted noise components having peak amplitudes exceeding that of the synchronizing components. When such a signal is intercepted by antenna 11, 12 and when the receiver is tuned to utilize the signal, it is amplified in radio frequency amplifier 10 and heterodyned to the selected intermediate frequency of the receiver in first detector or converter 13.

The resulting intermediate frequency signal from first detector 13 is amplified in intermediate frequency amplifier 14 and detected in second detector 15. The second detector produces a composite video signal having the aforesaid video, synchronizing and noise components.

The detector is connected so that the composite video signal is negative with respect to ground, and the synchronizing and noise components thereof extend in a negative-going direction. The composite video signal from second detector 15 is amplified in video amplifier 16 and applied to the input electrode of cathode-ray image reproducing device 17 to control the intensity of the cathode ray beam therein in accordance with the picture intelligence.

The composite video signal from second detector 15 is also amplified in synchronizing signal amplifier 18 and applied to synchronizing signal separator 19. Separator 19 separates the line and field synchronizing components from the composite video signal and applies these components to sweep systems 20 and 21. In this manner, the sweep systems and therefore the line and field deflections of reproducing device 17 are synchronized with the incoming television signal. Device 17 is able, therefore, to reproduce the picture intelligence of the received television signal. The sound portion of the receiver forms no part of the present invention and, for that reason, has not been shown.

Intermediate frequency amplifier 14 includes, preferably as its final stage, an electron discharge device 24 having an anode connected to the positive terminal B+ of a source of unidirectional potential through a primary winding 25 of a coupling transformer 26. The secondary winding 27 of transformer 26 has one side connected to a rectifier 28 (included in the circuit of detector 15) and the other side of winding 27 is connected to ground. Winding 27 is shunted by a tuning capacitor 29 and rectifier 28 is bypassed to ground for intermediate frequencies through a capacitor 30.

Rectifier 28 is coupled to video amplifier 16 through a pair of series peaking coils 31, 32, the latter coil being shunted by a damping resistor 33. The screen electrode of device 24 is connected to the positive terminals B+ through a resistor 34. The screen electrode is bypassed to ground through a series-resonant circuit including a capacitor 35 and an inductance coil 36, the series-resonant circuit being tuned to the intermediate frequency.

The side of peaking coil 32 connected to video amplifier 16 is also connected to the control electrode 37 of an electron discharge device 38 through a series peaking coil 39 and a limiting resistor 40, the peaking coil being shunted by a damping resistor 41. The junction of the peaking coil and resistor 40 is connected to ground through a resistor 42. Device 38 has a cathode 43 connected to ground through a resistor 44, and the device has an anode 45 connected to the positive terminal B+ through a load resistor 46. Resistor 42 is the load resistor for the second detector 15.

Cathode 43 of device 38 is connected to the cathode 47 of an electron discharge device 48, and the anode 49 of this device is connected to the positive terminal B+ through a resistor 50. Device 48 has a control electrode 51 which is connected to ground through a grid-leak resistor 52 and which is coupled to the screen electrode of intermediate frequency amplifier discharge device 24 through a coupling capacitor 53. The anode 45 of device 38 is coupled to the control electrode 54 of an electron discharge device 55 (constituting synchronizing signal separator 19) through a pair of coupling capacitors 56 and 57, capacitor 56 being shunted by a resistor 58 and control electrode 54 being connected to ground through a grid-leak resistor 59. Discharge device 55 has a cathode 60 connected to ground, and the device has an anode 61 connected to the positive terminal B+ through a load resistor 62. Anode 61 is further coupled to sweep systems 20 and 21.

As previously mentioned, detector 15 produces a negative polarity composite video signal which has video, synchronizing and noise components, and in which the synchronizing and noise components extend in a negative going direction. The composite video signal is supplied to the control electrode 37 of discharge device 38 through the direct coupling network including elements 39–42 and is amplified in device 38. The amplified composite video signal appears in the anode circuit of device 38 with the synchronizing components thereof extending in a positive-going direction, and the amplified composite video signal is impressed on discharge device 55 of separator 19 through the self-biasing network 56–59.

The self-biasing network biases device 55 so that the device translates normally only the line and field synchronizing components of the composite video signal regardless of the intensity of that signal. Should the high amplitude noise bursts be impressed on the self-biasing network, they would tend to drive the control electrode 54 of device 55 highly positive producing an excessive charge on coupling capacitors 56 and 57 in the self-biasing network. This excessive charge results in a negative bias on device 55, and the device is paralyzed and non-conductive to the synchronizing components for time intervals corresponding to the time constant of the self-biasing network. This effect is reduced to some extent by the disclosed self-biasing network which is of the known double time-constant type. During normal operation, capacitor 56 and resistor 58 constitute a relatively slow time-constant network, and capacitor 56 has a relatively high charge thereon to provide the proper bias for device 55. Networks 57 and 59, however, have a relatively fast time constant and capacitor 57 has a relatively low charge thereon during normal operation of the receiver. Should a high amplitude noise burst be impressed on the time constant network, most of the charge resulting therefrom is assimilated by capacitor 57 and rapidly discharged through resistor 59 so that the paralysis due to such a burst is materially decreased. However, it has been found that even with this disclosed time constant network, the operation of the synchronizing signal separator is not entirely satisfactory in the presence of an undue amount of noise bursts.

The present invention is intended to obviate the condition described above and this is achieved in the following manner. The screen electrode of the intermediate frrequency amplifier discharge device 24 is normally established at alternating-current ground potential, since the intermediate frequency signal is bypassed to ground through the series-resonant circuit 35, 36. However, should a noise burst with an appreciable amplitude accompany the television signal, the positive-going component of such a burst in the intermediate frequency amplifier drives device 24 to a non-linear portion of its characteristic and causes the device to act as a detector for such a burst. A noise detector of this type is described and claimed in the copending application of Richard A. Kraft, filed April 28, 1953, under Serial No. 351,615. Due to this action, each such noise burst causes the screen electrode to draw current through resistor 34 producing a negative-going burst on control electrode 51 of device 48 through capacitor 53. Device 48 is normally conductive and establishes a cathode bias across resistor 44 producing a positive bias on cathode 43 of device 38. The parameters of the circuit are such that under normal operation, device 38 translates the synchronizing and video components of the composite video signal applied to its control electrode despite the positive bias on its cathode.

When a noise burst of an amplitude exceeding the peak amplitude of the synchronizing components is received by the receiver, such a noise burst appears with negative-going polarity in the composite video signal at detector 15, and drives control electrode 37 of device 38 in a negative direction tending to produce a corresponding positive burst in the anode circuit of device 38. Such a positive burst, for the previously described reasons, produces an excessive charge on capacitors 56 and 57 and paralyzes separator 19. However, simultaneously with the production of the negative-going noise burst on control electrode 37, there is derived from the screen of device 24 a negative-going burst which is impressed on the control electrode 51 of device 48. The latter burst reduces the current flow through device 48 and correspondingly drops the positive bias potential across cathode resistor 44. The drop in bias potential across resistor 44 reduces the positive bias on cathode 43 so that the current flow through device 38 is not materially reduced even though the negative-going noise burst is impressed on the control electrode 37. Therefore, the undesired noise bursts in the composite video signal do not produce corresponding positive-going bursts in the anode circuit of device 38, or at least the amplitude of any positive-going burst produced in the anode circuit is materially reduced.

Due to the joint action of devices 38 and 48, the positive-going noise bursts do not reach self-biasing network 56–59 and, therefore, do not cause the resulting paralysis of separator 19. It is true that no synchronizing components reach separator device 55 for the duration of each of the noise bursts, but such durations are usually relatively short and do not impair materially the efficient operation of the separator. On the other hand, should the bursts be allowed to reach the self-biasing network of the separator, the resulting paralysis persists not only for the duration of each burst, but for a relatively long time interval determined by the time constant of the self-biasing network.

The invention provides, therefore, an improved television receiver which includes a relatively simple amplifier circuit which is constructed to isolate the self-biased synchronizing signal separator of the receiver from the noise bursts accompanying the received television signal, thereby to eliminate paralysis of the separator by such bursts.

While a particular embodiment of the invention has been shown and described, modifications may be made and it is intended in the appended claims to cover all such modifications as fall within the true spirit and scope of the invention.

I claim:

1. A television receiver for utilizing a television signal including video components, synchronizing components having a peak amplitude exceeding that of the video components, and undesired noise components having peak amplitudes exceeding that of the synchronizing components, said receiver including in combination, a detector for producing in response to such a television signal a composite video signal including the aforesaid video, synchronizing and noise components with said synchronizing and noise components extending in a negative going direction, an amplifier for said composite video signal including a discharge device having an anode, a cathode, and a control electrode; an input circuit for said amplifier coupled to said detector for impressing the aforesaid composite video signal on said control electrode so that said noise components tend to decrease the space current in said device; a control circuit for said amplifier including a second discharge device having an anode, a cathode and a control electrode, the cathode of said second device being direct-current connected to the cathode of said first device, an impedance coupled in common to the cathodes of said first and second devices so that the space current in said first device is controlled in accordance with the current flow in said second device; direct-current potential supply means for energizing said anodes of said discharge devices; and means for deriving the aforesaid noise components with negative going polarity and for impressing the aforesaid noise components on said control electrode of said second device to decrease the current flow therethrough for the duration of each such noise component, thereby to increase the space current in said first-mentioned discharge device for the duration of each such noise component so as to compensate for the decrease in space current therein due to such noise components.

2. A television receiver for utilizing a television signal including video components, synchronizing components having a peak amplitude exceeding that of the video components, and undesired noise components having peak amplitudes exceeding that of the synchronizing components, said receiver including in combination, a detector for producing in response to such a television signal a composite video signal including the aforesaid video, synchronizing and noise components, with said composite video signal having negative polarity with respect to a reference potential and with the synchronizing and noise components thereof extending in a negative-going direction; and amplifier for said composite video signal including an electron discharge device having an anode, a cathode and a control electrode; a resistor connecting said cathode to a point of said reference potential, a network direct-current connecting said control electrode to said detector for impressing the aforesaid composite video signal on said control electrode so that the noise components tend to decrease the space current in said device; a control circuit for said amplifier including a second electron discharge device biased to be normally conductive and having an anode, a cathode and a control electrode, the cathode of said second device being direct-current connected to a point of said resistor remote from said reference point for controlling the cathode bias on said first device in accordance with the current flow in said second device; direct-current potential supply means for energizing said anodes of said discharge devices; and detector means for deriving the aforesaid noise components and for impressing the aforesaid noise components on said control electrode of said second device with negative-going polarity to reduce the current flow in said second device for the duration of each such noise component, thereby to reduce the cathode bias on said first-mentioned discharge device and increase the space current therein for the duration of each such noise component so as to compensate for the decrease in space current therein due to such noise components.

3. A television receiver for utilizing a television signal including video components, synchronizing components having a peak amplitude exceeding that of the video components, and undesired noise components having peak amplitudes exceeding that of the synchronizing components, said receiver including in combination, a detector for producing in response to such a television signal a composite video signal including the aforesaid video, synchronizing and noise components; a pair of electron discharge devices each having an anode, a cathode and a control electrode; resistor means connecting the cathodes of said devices to a point of reference potential so that said discharge devices draw current therethrough; direct-current potential supply means for energizing the anodes of said discharge devices; a network coupling said detector to the control electrode of one of said devices for impressing the aforesaid composite video signal on said one of said devices with said noise components extending in a negative going direction so as to decrease the space current in said one of said devices for the duration of each such noise component; detector means for deriving the aforesaid noise components with negative going polarity and means for impressing the aforesaid noise components on the control electrode of the other of said devices; a synchronizing signal separator circuit; and a network coupling the anode of one of said discharge devices to said separator circuit.

4. A television receiver for utilizing a television signal including video components, synchronizing components having a peak amplitude exceeding that of the video components, and undesired noise components having peak amplitudes exceeding that of the synchronizing components, said receiver including in combination, a detector for producing in response to such a television signal a composite video signal including the aforesaid video, synchronizing and noise components, said composite video signal having negative polarity with respect to a reference potential with the synchronizing and noise components thereof extending in a negative-going direction; a first and a second electron discharge device each having an anode, a cathode and a control electrode; a common resistor connecting the cathodes of said devices to a point of reference potential so that space current for said discharge device is conducted therethrough; direct-current potential supply means for energizing the anodes of said discharge devices; a network direct-current connecting said detector to the control electrode of said first device for impressing the aforesaid negative composite video signal on said first device so that the noise components tend to decrease the space current in said first device; detector means for deriving the aforesaid noise components and means for impressing the aforesaid noise components with negative-going polarity on the control electrode of said second device; a synchronizing signal separator circuit including a third electron discharge device having a control electrode; and a resistant-capacity grid-leak network for controlling the bias of said third discharge device coupling the anode of said first discharge device to said control electrode of said third discharge device.

5. A television receiver for utilizing a television signal including video components, synchronizing components having a peak amplitude exceeding that of the video components, and which may include undesired noise components having peak amplitudes exceeding that of the synchronizing components, said receiver including in combination, detector means for producing in response to the television signal a composite video signal of given polarity including the aforesaid video, synchronizing and noise components, first and second electron discharge devices each having an anode, a cathode and a control electrode, direct current energizing circuit means coupling said anodes together and said cathodes together and including a common direct-current conducting impedance through which space currents for both of said discharge devices flow, circuit means coupling said detector means to the control electrode of said first discharge device to apply the composite video signal thereto, further circuit means coupled to one of said discharge devices for utilizing the video signal derived therefrom, means for deriving the undesired noise components of the television signal to the exclusion of the video and synchronizing components, and circuit means coupling said means for deriving the undesired noise components to the control electrode of said second discharge device for applying the noise components thereto with a polarity to cause cancellation of noise components in said composite video signal as developed in said further circuit means.

References Cited in the file of this patent

UNITED STATES PATENTS

| | | |
|---|---|---|
| 2,585,883 | Wendt | Feb. 12, 1952 |
| 2,651,675 | Wissel | Sept. 8, 1953 |

FOREIGN PATENTS

| | | |
|---|---|---|
| 631,377 | Great Britain | Nov. 2, 1949 |